US011455290B1

(12) United States Patent
Brahmadesam et al.

(10) Patent No.: US 11,455,290 B1
(45) Date of Patent: Sep. 27, 2022

(54) STREAMING DATABASE CHANGE DATA FROM DISTRIBUTED STORAGE

(71) Applicant: Amazon Technologies, Inc., Seattle, WA (US)

(72) Inventors: Murali Brahmadesam, Bangalore (IN); Nanda Kaushik, Fremont, CA (US); Changan Han, Kirkland, WA (US); Kartikey Bhatt, Sammamish, WA (US); Sangyong Hwang, Sammamish, WA (US); Punit Rajgaria, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

(21) Appl. No.: 16/915,332

(22) Filed: Jun. 29, 2020

(51) Int. Cl.
*G06F 16/23* (2019.01)
*G06F 16/22* (2019.01)
*G06F 16/242* (2019.01)
*G06F 16/11* (2019.01)
*G06F 16/16* (2019.01)
*G06F 16/18* (2019.01)
*G06F 16/17* (2019.01)

(52) U.S. Cl.
CPC ........ *G06F 16/2358* (2019.01); *G06F 16/128* (2019.01); *G06F 16/162* (2019.01); *G06F 16/1734* (2019.01); *G06F 16/1865* (2019.01); *G06F 16/2282* (2019.01); *G06F 16/2423* (2019.01)

(58) Field of Classification Search
CPC .............. G06F 16/2358; G06F 16/162; G06F 16/2282; G06F 16/2865; G06F 16/1734; G06F 16/2423; G06F 16/128
See application file for complete search history.

(56) References Cited

U.S. PATENT DOCUMENTS

| 11,080,262 | B1 * | 8/2021 | Levandoski | G06F 16/2282 |
| 2008/0162590 | A1 * | 7/2008 | Kundu | G06F 11/1471 |
| 2014/0258241 | A1 * | 9/2014 | Chen | G06F 16/2358 |
| | | | | 707/683 |
| 2015/0278270 | A1 * | 10/2015 | Zhang | G06F 16/2246 |
| | | | | 707/696 |
| 2017/0308568 | A1 * | 10/2017 | Laethem | G06F 8/65 |
| 2017/0351584 | A1 * | 12/2017 | Griffith | G06F 16/2358 |
| 2019/0065542 | A1 * | 2/2019 | Baker | G06F 16/273 |
| 2020/0034459 | A1 * | 1/2020 | Rabe | G06F 16/27 |

OTHER PUBLICATIONS

Unpublished U.S. Patent Application for Online Restore for Database Engines, U.S. Appl. No. 15/616,888, filed Jun. 7, 2017.

* cited by examiner

*Primary Examiner* — Matthew J Ellis
(74) *Attorney, Agent, or Firm* — Nicholson De Vos Webster & Elliott LLP

(57) ABSTRACT

Techniques for distributed database storage utilizing split volume types for redo log records and change log records are described. A database engine sends redo log data to a first set of page storage nodes and change log data to a second set of tuple storage nodes, where the change log data is stored in an indexed manner Client access to change log data may be provided through a separate set of streaming storage servers instead of through the database engine.

20 Claims, 9 Drawing Sheets

```
CHANGE LOG TABLE 312                                402A-402M

LSN                     123456
DATABASE_NAME           ABC123.DATABASE1
TRANSACTIONID           7200
SHARDSEQUENCENUMBER     3
TIMESTAMP               2020-01-03 21:59:69.10
EVENTTYPE               UPDATE_ROWS_EVENTV2
EVENTLENGTH             505
EVENTFLAGS              LOG_EVENT_SUPPRESS_USE_F
OFFSETINTRANSACTION     14
CHANGEDATA              ...
```

```
TRANSACTION TABLE 314                               404A-404N

TRANSACTIONID              7200
SHARDSEQUENCENUMBER        3
COMMITSEQUENCENUMBER:      7234114782
COMMITSTATUS:              COMMITTED
BEGINTRANSACTIONTIMESTAMP  2020-01-03 21:54:64.30
ENDTRANSACTIONTIMESTAMP    2020-01-03 22:04:39.13
SERVERID                   TABLESERVER1234-35W
BEGINLSN                   123455
ENDLSN                     126466
FILENAME                   ZXCV23543WDD.LG
FILEOFFSET                 14221
LISTOFSHARDS               2,3,4
TOTALCHANGEDATALENGTH      55
```

*FIG. 4*

STREAMING DATABASE CHANGE DATA FROM DISTRIBUTED STORAGE

BACKGROUND

In modern distributed cloud services, resilience and scalability are increasingly achieved by decoupling compute from storage and by replicating storage across multiple nodes. Doing so lets the database operator handle operations such as replacing misbehaving or unreachable hosts, adding replicas, failing over from a writer to a replica, scaling the size of a database instance up or down, etc.

The I/O bottleneck faced by traditional database systems changes in this environment. As I/Os can be spread across many nodes and many disks in a multi-tenant fleet, the individual disks and nodes are no longer hot. Instead, the bottleneck moves to the network between the database tier requesting I/Os and the storage tier that performs these I/Os. Beyond the basic bottlenecks of packets per second (PPS) and bandwidth, there is amplification of traffic since a performant database will issue writes out to the storage fleet in parallel. The performance of the outlier storage node, disk, or network path can dominate response time.

BRIEF DESCRIPTION OF DRAWINGS

Various embodiments in accordance with the present disclosure will be described with reference to the drawings, in which:

FIG. 4 illustrates exemplary change log records and transaction records in a distributed relational database service utilizing split volume types for redo log records and change log records according to some embodiments.

DETAILED DESCRIPTION

The present disclosure relates to methods, apparatus, systems, and non-transitory computer-readable storage media for implementing a distributed database utilizing split volume types for redo log records and change log records. According to some embodiments, change log data (e.g., binary log (or "binlog") record data of MySQL, write ahead log (WAL) data segments of Postgres, and the like) of a database is stored in an efficient distributed storage that handles transactional semantics, while redo log data records (e.g., InnoDB redo log file records), are stored in a separate distributed storage environment. Accordingly, retrieval of committed change data can be done without intervention of database engine, which eliminates bottlenecks in access and allows the database to scale.

Figure 1:
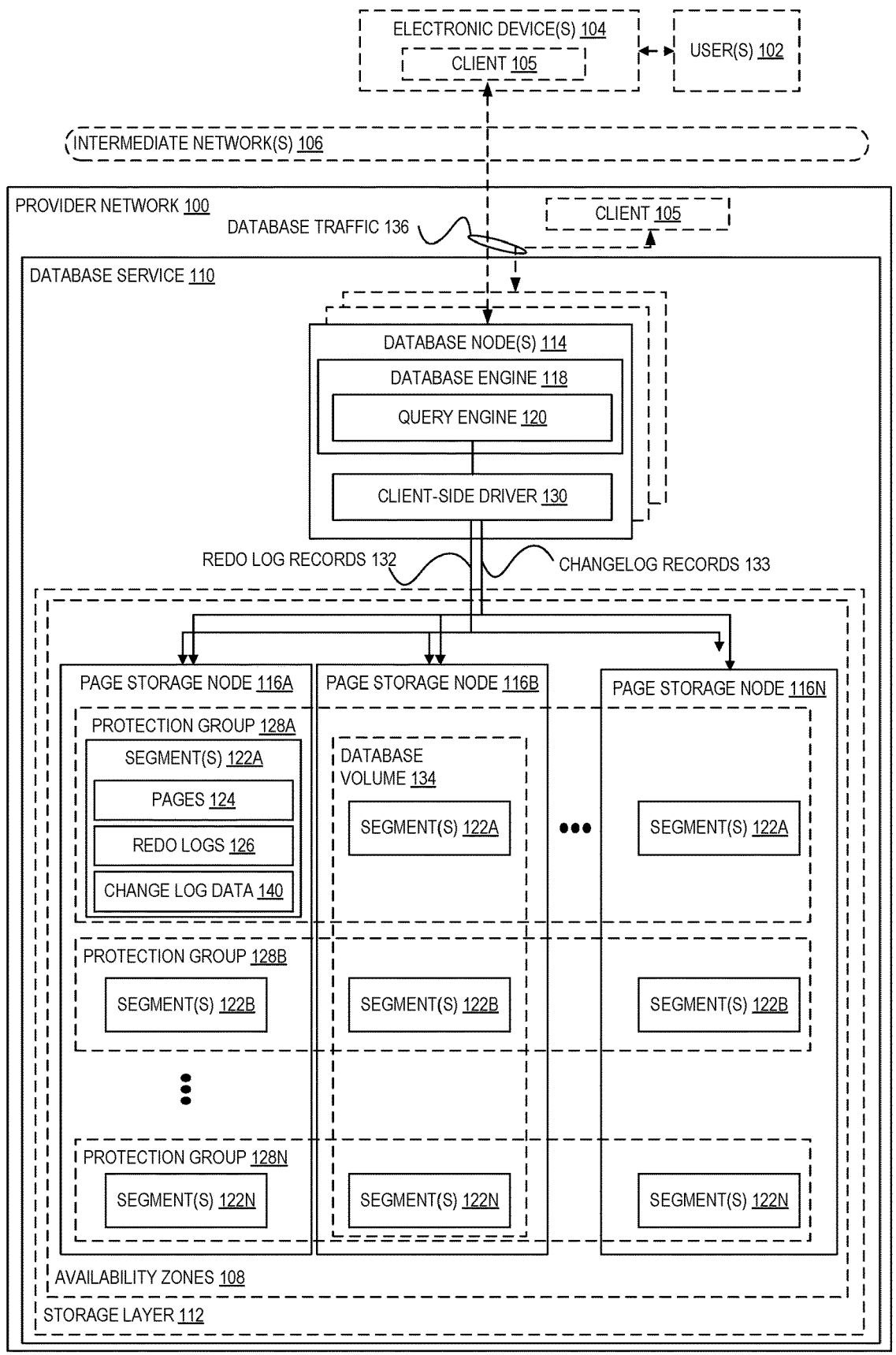
FIG. 1 illustrates an exemplary system including a distributed relational database service provided by a service provider network utilizing redo log record and change log record steams according to some embodiments

FIG. 1 illustrates an exemplary system including a distributed relational database service provided by a service provider network utilizing redo log record and change log record steams according to some embodiments. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users (e.g., users 102) may use electronic device(s) 104 to interact with a provider network 100 across one or more intermediate networks 106 (e.g., the internal via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

A cloud provider network can be formed as a number of regions, where a region is a geographical area in which the cloud provider clusters data centers. Each region includes multiple (e.g., two or more) availability zones (AZs) (e.g., including availability zones 108) connected to one another via a private high-speed network, for example a fiber communication connection. An AZ provides an isolated failure domain including one or more data center facilities with separate power, separate networking, and separate cooling from those in another AZ. AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an API call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The provider network 100 illustrated in FIG. 1 includes a database service 110, among any number of other services. According to some embodiments, the database service 110 enables clients 105 of users to create, manage, and use databases (e.g., relational databases) in a cloud-based environment in a manner that provides enhanced security, availability, and reliability relative to other database environments. In some embodiments, the database service 110 features a distributed, fault-tolerant, and self-healing storage system that automatically scales (e.g., implemented in part using a scalable storage layer 112). In some embodiments, a database system provided by a database service 110 organizes the basic operations of a database (e.g., query processing, transaction management, caching, and storage) into tiers that can be individually and independently scalable. For example, in some embodiments, each database instance provided by the database service 110 includes a database tier (which may include one or more database nodes 114, sometimes also referred to as "head nodes"), a separate and distributed storage system (which may include multiple page storage nodes 116 that collectively perform some of the operations traditionally performed in the database tier of existing database systems), and a backup storage tier.

In general, a database is a set of data, collection of records, or other grouping of data objects stored in a data store. In some embodiments, a data store includes one or more directly or network-attached storage devices accessible to a database engine 118 (e.g., block-based storage devices like hard disk drives or solid-state drives). As indicated above, in some embodiments, the data store is managed by a separate storage layer 112. In some embodiments, management of the data store at a separate storage layer 112 includes distributing the data amongst multiple different storage nodes (e.g., page storage nodes 116A-116N) to provide redundancy and availability for the data.

In some embodiments, the data for a database is stored in one or more portions of the data store, such as data pages. One or multiple data values, records, or objects may be stored in a data page. In some embodiments, data pages further include metadata or other information for providing access to the database. For example, data pages can store data dictionaries, transaction logs, undo and redo log records, and so forth. A query engine 120 of a database engine 118 performs access requests (e.g., requests to read, obtain, query, write, update, modify, or otherwise access) based on state information. The state information can include, for example, data dictionaries, undo logs, transaction logs/tables, indexing structures, mapping information, data page caches or buffers, and the like, or any other information used to perform access requests with respect to the database. For example, state information may include mapping information (e.g., an index) used to obtain data records that match certain search criteria (e.g., query predicates).

In some embodiments, some operations of a database (e.g., backup, restore, recovery, log record manipulation, and/or various space management operations) are offloaded from the database engine 118 to the storage layer and distributed across multiple storage nodes and storage devices. For example, in some embodiments, rather than a database engine 118 applying changes to a database (or data pages thereof) and then sending the modified data pages to the storage layer, the application of changes to the stored database (and data pages thereof) is the responsibility of the storage layer itself. According to embodiments, a database engine 118 sends redo log records, rather than modified data pages, to the storage layer. The storage layer then performs redo processing (e.g., the application of the redo log records) in a distributed manner (e.g., by a background process running on the page storage nodes 116A-116N).

In some embodiments, log sequence numbers (LSNs) are assigned to the redo log records from a log sequence number space. Crash recovery (e.g., the rebuilding of data pages from stored redo log records) in some embodiments is performed by the storage layer and may also be performed by a distributed background process. The storage layer maintains backup versions of data volumes in a separate storage system (e.g., in another storage service implemented as part of the cloud provider network 100) by leveraging peer-to-peer replication among storage nodes to identify and obtain new updates to data volumes for inclusion in backup versions.

In some embodiments, because only redo logs (and not modified data pages) are sent to the storage layer, there is comparatively much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In some embodiments, the database systems described herein may retain much of the structure of the upper half of a database instance (e.g., query parsing and query optimization layer, a query execution layer, and a transactionality and consistency management layer) but may redistribute responsibility for at least portions of the backup, restore, snapshot, recovery, and various space management operations to the storage tier. Redistributing functionality in this manner and tightly coupling log processing between the database tier and the storage tier may improve performance, increase availability and reduce costs, when compared to previous approaches to providing a scalable database, in some embodiments. For example, network and input/output bandwidth requirements may be reduced because only redo log records (which are much smaller in size than actual data pages) may be sent across nodes or persisted within the latency path of write operations. In addition, the generation of data pages can be performed independently in the background on each storage node (as foreground processing allows) without blocking incoming write operations. In some embodiments, the use of log-structured, non-overwrite storage may allow copy creation, backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and metadata associated with that data, such as redo log records) across multiple storage nodes. For example, data and metadata of a database may be replicated locally (e.g., within a single availability zone 108 in which a collection of page storage nodes 116 executes on its own physically distinct, independent infrastructure) and across availability zones 108 in a single region or in different regions.

In some embodiments, the database systems described herein support a standard or custom API for a variety of database operations. For example, the API may support operations for creating a database, creating a table, altering a table, creating a user, dropping a user, inserting one or more rows in a table, copying values, selecting data from within a table (e.g., querying a table) canceling or aborting a query, creating a snapshot, performing an online restore or "backtrack" operation, among other possible operations.

In some embodiments, each data page may be stored in a segment, such that each segment (e.g., segment 122A) stores a collection of one or more pages 124, redo logs 126 and change log data 140. The pages 124 may include data pages constructed based on the redo logs 126 and/or change log pages constructed based on the change log data 140. Thus, redo logs and/or redo logs 126 may be segmented to the protection group 128 of which the segment is a member. In some embodiments, data pages and redo logs and change logs are mirrored across multiple storage nodes, according to a variable configuration, such as in a protection group 128 (which may be specified by the client on whose behalf the databases are being maintained in the database system). For example, in some embodiments, one, two, or three copies of the data or redo logs or change logs may be stored in each of one, two, or three different availability zones or regions, according to a default configuration, an application-specific durability preference, or a client-specified durability preference.

In some embodiments, a user's database created using a database service 110 is implemented by one or more database nodes 114, each hosting a database engine (e.g., database engine 118), and a fleet of page storage nodes 116. In some embodiments, a database engine 118 includes various components associated with a traditional database kernel, including a query engine 120 and other components implementing transactions, locking, buffer cache, access methods, and undo management. In some embodiments, a database engine 118 receives requests (e.g., queries to read or write data, etc.) from various client 105 applications, parses the requests, optimizes the requests, and develops an execution plan to carry out the associated database operations. In some embodiments, the database engine 118 returns query responses to client applications, which may include write acknowledgements, requested data pages (or portions thereof), error messages, and other responses as appropriate.

In some embodiments, a database node 114 is responsible for receiving SQL requests from client applications, e.g., through a JDBC or ODBC interface, and for performing SQL processing and transaction management (which may include locking) locally. However, rather than generating data pages locally, the database node 114 (or various components thereof) generates redo log records and sends the redo log records to the appropriate page storage nodes 116 of a separate distributed storage system. In some embodiments, a client side driver 130 for the distributed storage system is hosted on the database node 114 and is responsible for routing redo log records 132 to the storage system node(s) 116 that store the segments (or data pages thereof) to which those redo log records 132 are directed.

Additionally, in some cases users of the database service 110 may desire to enable change logs, e.g., in the form of binary logging (or "bin logging") via use of a binlog. Generally, a binlog is one type of change log that may be a set of one or more files containing a record of all statements that attempt to change table data of the database (e.g., updates, insertions, deletions). These statements can be replayed to bring secondary (or slave) servers up to date in a replication scenario, to bring a database up to date after restoring table data from a backup, etc. In many databases, change logging can be turned on and off.

Thus, in some implementations, for database statements that change table data of the database, another stream of data—in the form of change log records 133—is also sent to ones of the page storage nodes 116 and stored as change log data 140.

In some embodiments, each segment 122 of a database is replicated (or otherwise made durable) on multiple storage system nodes 116 that form a "protection group." In such embodiments, the client-side driver 130 tracks the page storage nodes 116 on which each segment is stored and routes redo log records 132 to all of the nodes on which a segment is stored (e.g., asynchronously and in parallel) when a client request is received. As soon as the client-side driver 130 receives an acknowledgment back from a write quorum of the page storage nodes 116 in the protection group (which may indicate that the redo log record has been written to the storage node), it sends an acknowledgment of the requested change to the database tier (e.g., to the database node 114). For example, in embodiments in which data is made durable through the use of protection groups 128, the database node 114 may not be able to commit a transaction until and unless the client-side driver 130 receives a reply from enough page storage nodes 116 to constitute a write quorum, as may be defined in a protection group policy for the data.

In some embodiments, the database tier (or, more specifically, a database node 114) includes a cache in which recently accessed data pages are held temporarily. In such embodiments, if a write request is received that targets a data page held in such a cache, in addition to sending a corresponding redo log record 132 to the storage layer, the database engine applies the change to the copy of the data page held in its cache. A data page held in this cache may not ever be flushed to the storage layer and may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes but may exist only on the database node 114 for a given database instance. Therefore, there may be no cache coherency or consistency issues to manage.

As indicated above, in some embodiments, a database node 114 includes a client-side storage driver 130, which routes read requests or redo log records 132 to various page storage nodes 116 within the storage layer 112, receives write acknowledgements from the storage layer 112, receives requested data pages from the storage layer 112, or return data pages, error messages, or other responses to a database engine 118. In some embodiments, the client-side driver 130 running on the database node 114 may expose a private interface to one or more other components (e.g., other database engines or virtual computing service components). In some embodiments, storage for a database instance in the storage tier may be modeled as a single volume that can grow in size without limits and that can have an unlimited number of Input/Output Operations Per Second (IOPS) associated with it. When a volume is created, it may be created with a specific size, with specific availability/durability characteristics (e.g., specifying how it is to be replicated) and with an IOPS rate associated with it (e.g., both peak and sustained). For example, in some embodiments, a variety of different durability models may be supported, and users may be able to specify, for their database, a number of replication copies, availability zones, or regions and whether replication is synchronous or asynchronous based upon their durability, performance, and cost objectives.

In some embodiments, the client-side driver 130 may maintain metadata about the volume and directly send asynchronous requests to each of the page storage nodes 116 necessary to fulfill read and write requests without requiring additional hops between storage nodes. In some embodiments, the volume metadata indicates which protection groups 128, and their respective page storage nodes 116, maintain which partitions of the volume. For example, in some embodiments, in response to a request to make a change to a database, the client-side driver 130 determines the protection group 128, and its one or more page storage nodes 116 that are implementing the storage for the targeted data page, and routes the redo log record(s) 132 specifying that change to those storage nodes. The page storage nodes 116 may then be responsible for applying the change specified in the redo log record to the targeted data page at some point in the future. As writes are acknowledged back to the client-side driver 130, the client-side driver 130 may advance the point at which the volume is durable and may acknowledge commits back to the database tier, in some embodiments. As previously noted, in some embodiments, the client-side driver 130 may not ever send data pages to the page storage nodes 116. This may not only reduce network traffic but may also remove the need for the checkpoint or background writer threads that constrain foreground processing throughput in previous database systems.

In some embodiments, many read requests may be served by the database node 114 cache. However, write requests may require durability since large scale failure events may be too common to allow only in-memory replication. Therefore, the systems described herein may minimize the cost of the redo log record write operations that are in the foreground latency path by implementing data storage in the storage tier as two regions: a small append-only log-structured region into which redo log records 132 are written when they are received from the database tier, and a larger region in which redo log records are coalesced together to create new versions of data pages in the background. In some embodiments, an in-memory structure may be maintained for each data page that points to the last redo log record for that page, backward chaining redo log records until an instantiated data block is referenced. This approach may provide good performance for mixed read-write workloads including applications in which reads are largely cached.

In some embodiments, copies of databases may be created in the storage tier that share data pages with the source of the copy. For example, a copy of a portion of a database (e.g., an extent of a database volume 134) may be stored on the same storage node as the source database and include pointers to data pages stored in the source database so that the resulting amount of storage consumed by the copy is limited to storing changes to data pages that differ from the original copy, providing a copy-on-write technique for creating and updating copies of a database. Although not illustrated in FIG. 1, in some embodiments, the page storage nodes 116 also interface with a separate backup data store, system, service, or device. In this example, various data, such as data pages, redo log records, and any other data maintained by distributed storage service internal clients, such as database service 110 or other virtual computing services, or external clients, may be sent periodically to a backup data store.

In some embodiments, different storage policies are implemented by the database service 110. Examples of such storage policies include a durability policy (e.g., a policy indicating the number of instances of a database (or data pages thereof) that will be stored and the number of different storage nodes on which they will be stored) and a load balancing policy (which may distribute databases, or data pages thereof, across different storage nodes, volumes, or disks in an attempt to equalize traffic). In addition, different storage policies may be applied to different types of stored items by various services. For example, in some embodiments, the storage service may implement a higher durability for redo log records than for data pages, etc.

As indicated above, in some embodiments, a database service 110 replicates users' databases to provide resiliency to failure. In some embodiments, a user's database is partitioned into fixed size segments 122, each of which is replicated across the page storage nodes 116. In some embodiments, each set of fixed sized segments replicated across the page storage nodes 116 is grouped into a "protection group" (e.g., one of protection groups 128), such that each protection group consists of N fixed size segments organized across M availability zones 108. In some embodiments, a logical database volume 134 used to store the data of a database is thus a concatenated set of protection groups 128, physically implemented using a fleet of storage nodes (e.g., including page storage nodes 116A-116N) provided as virtual hosts with attached SSDs. In some embodiments, the protection groups that constitute a volume are allocated as the volume grows, where the database service 110 may support volumes that can grow up to a defined size limit (e.g., 64 TB or any other limit).

In some embodiments, a page storage node 116 includes hardware and software implementing various segment management functions. For example, each storage node may perform any or all of the following operations: replication (e.g., locally within the storage node), coalescing of redo logs to generate data pages, log management (e g, manipulating redo log records), crash recovery (e.g., determining candidate redo log records for volume recovery), creating snapshots of segments stored at the storage node, and space management (e.g., for a segment or state storage). In some embodiments, each page storage node 116 has one or more attached storage devices (e.g., SSDs, HDDs, or other persistent storage devices) on which data blocks may be stored on behalf of clients.

In some embodiments, each of the page storage nodes 116 implements processes running on the node that manage communication with one or more database node 114, for example, to receive redo log records 132, send back data pages, etc. In some embodiments, data blocks written to the storage system may be backed up to long-term or archival storage (e.g., in a remote key-value durable backup storage system).

In some embodiments, a storage layer 112 implements a storage service control plane that performs various storage system management functions. For example, a storage service control plane may implement a volume manager, which may maintain mapping information or other metadata for a database volume 134, such as current volume state, current writer, truncation tables, or other truncation information, or any other information for a volume as it is persisted in varying extents, segments, and protection groups. In some embodiments, the volume manager communicates with a client-side driver 130 to "mount" or "open" the volume for the client, providing the client-side driver 130 with mapping information, protection group policies, and various other information used to send write and read requests to page storage nodes 116. The volume manager may provide the maintained information to storage clients, such as a database node 114 or client-side driver 130 or to other system components such as a backup agent. For example, the volume manager may provide a current volume state (e.g., clean, dirty, or recovery), current epoch or other version indicator for the volume, or any other information about a data volume.

FIG. 1 illustrates a process that includes a database node 114 processing database traffic 136. In some embodiments, clients 105 of the database service 110 may submit queries and other requests associated with a particular database instance in a number of ways, e.g., interactively via an SQL interface to the database system. In some embodiments, external applications and programs may submit queries using Open Database Connectivity (ODBC) or Java Database Connectivity (JDBC) driver interfaces to the database system.

In some embodiments, database traffic 136 is received and processed by the database instance, where the traffic includes operations that modify the content of the database. In some embodiments, clients 105 of the database instance can include any type of client configurable to submit requests to network-based services via a network, including requests for database services (e.g., a request to create a copy of a database, etc.). For example, a given client may include a suitable version of a web browser or may include a plug-in module or other type of code module that can execute as an extension to or within an execution environment provided by a web browser. Alternatively, a client 105 can include a database application, a media application, an office application, or any other application that makes use of persistent storage resources to store and access one or more databases. In some embodiments, such an application includes sufficient protocol support (e.g., for a suitable version of HTTP) for generating and processing network-based services requests without necessarily implementing full browser support for all types of network-based data. That is, a client 105 may be an application that can interact directly with the cloud provider network 100 or within the cloud provider network 100. In some embodiments, clients may generate network-based services requests according to a Representational State Transfer (REST)-style network-based services architecture, a document-based or message-based network-based services architecture, or another suitable network-based services architecture. Accordingly, a client 105 may be executed by a computing device 104 outside of the provider network 100 or within the provider network 100 (e.g., as an application executed by a hardware virtualization service, for example).

In some embodiments, the database traffic 136 is generated by a client 105 application that provides access to storage of databases or other applications in a manner that is transparent to those applications. For example, the client 105 application may integrate with an operating system or file system to provide storage in accordance with a suitable variant of the storage models described herein. However, the operating system or file system may present a different storage interface to applications, such as a conventional file system hierarchy of files, directories, or folders. In such an embodiment, applications may not need to be modified to make sure of the storage system service model. Instead, the details of interfacing to the cloud provider network 100 may be coordinated by the client application and the operating system or file system on behalf of applications executing within the operating system environment. In some embodiments, the client application generating database traffic 136 send network-based services requests (e.g., a request to create a copy of a database, queries to a database, etc.) to and receive responses from the cloud provider network 100 via one or more intermediate networks 106.

In some embodiments, a cloud provider network 100 implements various user management features. For example, the cloud provider network 100 may coordinate the metering and accounting of client usage of network-based services, including storage resources, such as by tracking the identities of requesting clients, the number or frequency of client requests, the size of data tables stored or retrieved on behalf of the clients, overall storage bandwidth used by clients, class of storage requested by clients, or any other measurable client usage parameter. In some embodiments, a cloud provider network 100 also implements financial accounting and billing systems or may maintain a database of usage data that may be queried and processed by external systems for reporting and billing of client usage activity. In some embodiments, the cloud provider network 100 collects, monitors, or aggregates a variety of storage service system operational metrics such as metrics reflecting the rates and types of requests received from clients, bandwidth utilized by such requests, system processing latency for requests, system component utilization, rates and types of errors resulting from requests, characteristics of storage and requested data pages or records thereof (e.g., size, data type, etc.) or any other suitable metrics. In some embodiments, such metrics may be used by system administrators to tune and maintain system components, while in other embodiments such metrics may be exposed to users to enable such users to monitor their usage of the database service 110 and other services.

In some embodiments, a cloud provider network 100 also implements user authentication and access control procedures. For example, for a given network-based services request to access a particular database instance, the cloud provider network 100 may ascertain whether the requesting client associated with the request is authorized to access the particular database instance. The cloud provider network 100 may determine such authorization by, for example, evaluating an identity, password, or other credential against credentials associated with the particular database, or by evaluating the requested access to the particular database against an access control list of the particular database, in some embodiments. For example, if a client does not have sufficient credentials to access a particular database, the cloud provider network 100 may reject the corresponding request, for example, by returning a response to the client indicating an error condition.

When a traditional database modifies a data page (e.g., in response to a write operation), it generates a redo log record and invokes a log applicator that applies the redo log record to the in-memory before-image of the page to produce its after-image. Transaction commit requires the log to be written, but the data page write may be deferred. As described herein, in some embodiments of the database service 110, the writes that cross the network are redo log records 132. As shown in FIG. 1, a database engine 118 processing a write sends redo log records 132 to the storage layer 112.

In some embodiments, the log applicator functionality is implemented at the storage tier where it can be used to generate database pages in the background or on demand Generating each page from the complete chain of its modifications from the beginning of time may be prohibitively expensive and, thus, in some embodiments, each page storage node 116 continually materializes database pages in the background to avoid regenerating them from scratch on demand each time. The storage nodes use the redo log records (e.g., redo logs 126 associated with segment 122A) to apply changes to their buffer caches. The database engine awaits quorum from the storage nodes to satisfy the write quorum and to consider the redo log records in question durable or hardened.

As indicated above, database query requests of database traffic 136 typically include requests to write to various data pages of a database instance. These requests are parsed and optimized to generate one or more write record requests, which may be sent to the client-side driver 130 for subsequent routing to the storage system. In this example, the client-side driver 130 generates one or more redo log records 132 corresponding to each write record request, and sends them to specific ones of the page storage nodes 116 of specific protection groups 128 storing the partition user data of user data space to which the write record request pertains. In some embodiments, page storage nodes 116 perform various peer-to-peer communications to replicate redo log records received at a storage node to other storage nodes that may not have received the redo log records. In some embodiments, the client-side driver 130 generates metadata for each of the redo log records that includes an indication of a previous log sequence number of a log record maintained at the specific protection group.

In some embodiments, each redo log record 132 is associated with an LSN that is a monotonically increasing value generated by the database. In some embodiments, a database node 114 continuously interacts with the storage layer 112 and maintains state to establish quorum, advance volume durability, and register transactions as committed. As the database receives acknowledgements to establish the write quorum for each batch of redo log records, it advances the current volume durable LSN (VDL). As noted, a data volume may consist of multiple extents, each represented by a protection group consisting of one or more segments. In some embodiments, redo log records 132 directed to different extents may have interleaved LSNs. For changes to the volume to be durable up to a particular LSN, it may be necessary for all redo log records up to that LSN to be durable, regardless of the extent to which they belong. In some embodiments, the client-side driver 130 keeps track of outstanding redo log records that have not yet been made durable, and once all redo log records up to a specific LSN are made durable, it may send a volume durable LSN (VDL) message to one of the protection groups in the volume. The VDL may then be written to all synchronous mirror segments for the protection group.

As described above, in some implementations of a distributed database service 110, (at least) two important streams of data may be sent from the database nodes 114 to the storage layer (e.g., page storage nodes 116)—the redo log records 132 and, if enabled, change log records 133.

Many users want to utilize the change log, e.g., to track data changes related to change data capture (CDC) for auditing, copying data to another system, reacting to events, etc. However, in many database systems, the use of a change log (e.g., the binlog in MySql) is typically disabled by default. This is partially because, when enabled, the performance of the database goes down significantly—perhaps as much as 75%—which further makes the database not scalable. This is because, for every database transaction, the database engine 118 generates these two streams: redo log records 132, and change log records 133. These records need to be persisted in an atomic manner (e.g., using a "2 phase commit" (2PC) technique), which drops the performance significantly. Further, when users need to read this change log data—on top of the writing of the change log data, as well as the writing of the redo logs, and the use of the redo logs for regular database use—the reader occupies a lot of computing resource (e.g., the CPU) of the page storage nodes 116 and/or database nodes 114, and thus the foreground I/O is reduced even further (e.g., as the CPU is less available for regular databases operations). Accordingly, there exists a strong need to enable change logs/binlogging in distributed database systems for replication, auditing, and other reasons, but without the significant negative effects that arise as a result, such as the typical performance degradations.

Figure 2:
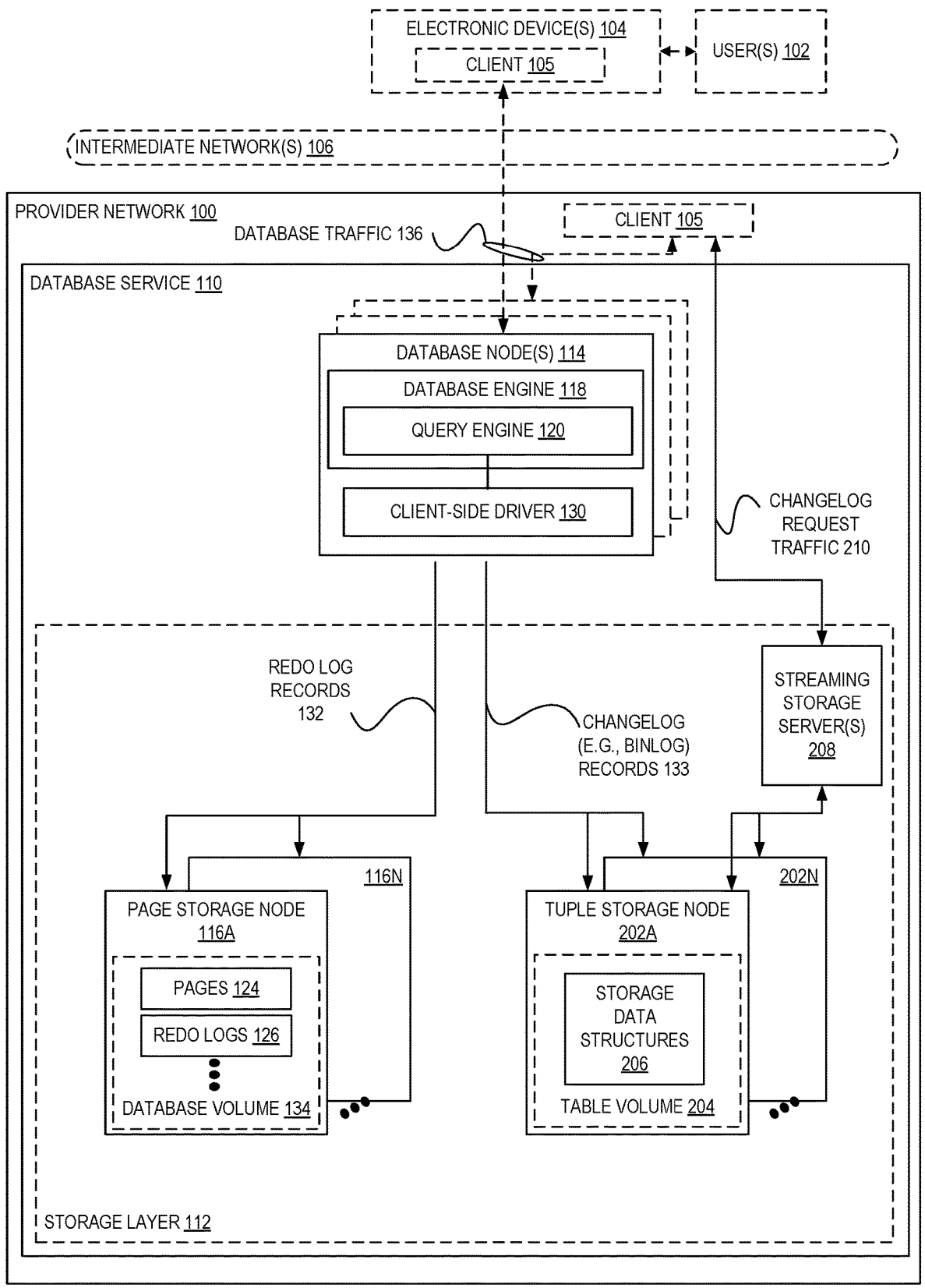
FIG. 2 illustrates an exemplary system including a distributed relational database service provided by a service provider network utilizing split volume types for redo log records and change log records according to some embodiments.

To this end, FIG. 2 illustrates an exemplary system including a distributed relational database service provided by a service provider network utilizing split volume types for redo log records and change log records according to some embodiments.

As shown in this figure, in some embodiments the redo log records 132 may still be written to database volumes 134 provided by page storage nodes 116, but the system may utilize a new type of volume—a "table" volume 204 provided by separate tuple storage nodes 202A-202N having storage data structures 206. In this configuration, each tuple storage node 202 hosting a table volume 204 has one or more storage data structures that may store and/or index individual change log records. As a result, when a database node 114 (or "head node") performs a write to the data (e.g., for an insertion, deletion, update, etc.) of the database, the write can be performed in parallel in that the redo log records 132 are sent to the page storage node(s) 116 and the change log records 133 are sent to the tuple storage nodes 202. Moreover, embodiments need not perform these writes in a two-phase commit (2PC) process, as when a write happens each gets committed, and a recovery algorithm can handle determining which one happens in what order—i.e., which goes first, second, etc. In some embodiments, the change log events can be sent as they occur without having to wait for transaction completion, and this architecture produces an advantage in that there is no loss of information in cases where the transaction is rolled back. For example, it is useful to know the number and type of transactions that are rolled back once these transaction have made modifications, which assists application developers with a better design of their solution.

In addition to this parallelism, in some embodiments reads involving the change log records (e.g., change log request traffic 210) can bypass going through the database nodes 114 and instead be issued directly to one or more streaming storage servers 208, which can directly interact with the tuple storage nodes 202 to obtain the necessary change log data and return this data to the client 105. As a result, the processing load on both the database nodes 114 as well as the page storage nodes 116 is significantly reduced due to the change log reads and writes being completely removed from their burden.

Figure 3:
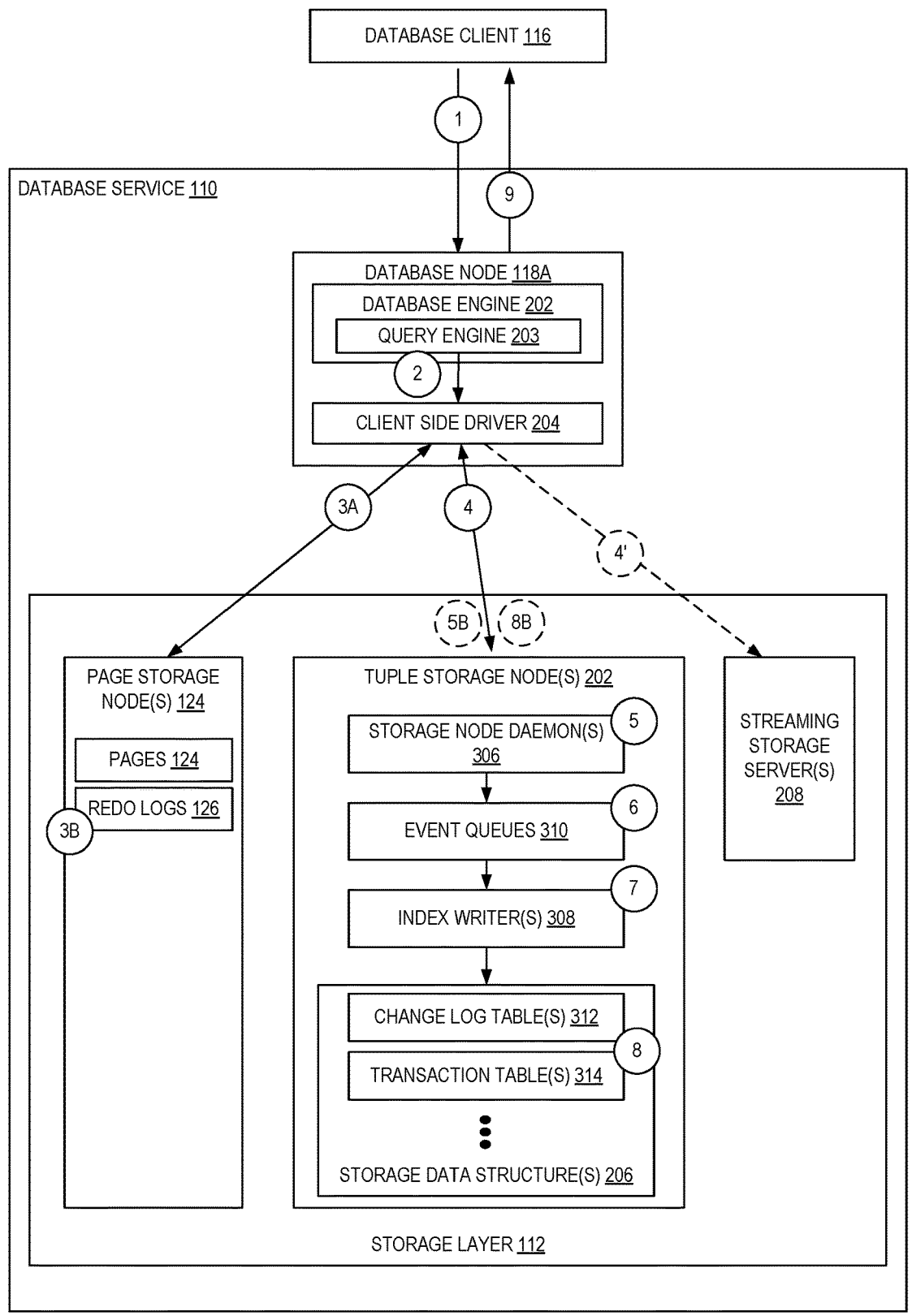
FIG. 3 illustrates an exemplary architecture of a table volume and exemplary write operations in a distributed relational database service utilizing split volume types for redo log records and change log records according to some embodiments.

For further detail, FIG. 3 illustrates an exemplary architecture of a table volume and exemplary write operations in a distributed relational database service utilizing split volume types for redo log records and change log records according to some embodiments. At circle (1), a database client 116 interacts with the database by, for example, issuing a SQL statement to a head node (e.g., database node 114A), which may be an UPDATE, DELETE, INSERT, or the like. At circle (2), the database engine 202 processes the request to generate redo log records and change log records. These records are sent to the client-side driver 204, which serves as an interfacing driver between the database engine 202 and the storage layer 112. The client-side driver 204 translates the redo log record(s) into a language that can be interpreted by the page storage node(s) 116, determines which page storage nodes 116 to write to, e.g., based on quorum and any other requirements, and sends, at circle (3A), redo log record writes to one or more database volumes provided by the page storage nodes 116, which are written to redo logs 126 at circle (3B) as discussed in greater detail above. The client-side driver 204 also sends the change log record writes at circle (4) to one or more tuple storage nodes 202. These change log records may have been adorned with other data, such as a transaction ID, LSN chain, etc. Prior to sending these records, the client-side driver 204 determines to which tuple storage nodes 202 the change log events are to be sent to. In some embodiments, the client-side driver 204 also sends commit records, which may be adorned with data indicating shards (e.g., segments, or portions of segments) where change log events are stored.

The client-side driver 204, when a commit is made durable (e.g., by the tuple storage nodes 202), notifies the streaming storage server(s) 208 as shown by circle (4')—the streaming storage server(s) may then process the change data request almost immediately.

Upon receipt of a change log record, at circle (5) storage node daemon(s) 306 get the "write" and processes it to cause these records to be stored. For example, in some embodiments at the daemon(s) 306 create entries in one or more event queues 310 at circle (6), which are serviced at circle (7) by one or more index writers 308. These index writer(s) 308 take the event queue 310 entries and update storage data structures 206 accordingly at circle (8).

For example, in some embodiments the change log records are stored in a database-like data structure such as a B-Tree or the like forming change log tables 312, which may be indexed with one or more keys. The index writers 308 may also update one or more transaction table 314 data structures with transaction metadata associated with sets of the change log records and may indicate which transactions carrying change log records are or are not committed.

As a result, a number of indexes may be formed over potentially a variety of data entities, such as transactions, change log records themselves, user table identifiers, etc., allowing for various forms of efficient querying.

In some embodiments, the persistence of the change log records may be acknowledged by the tuple storage nodes 202 to the client-side driver 204, e.g., after the storage node daemon(s) receive and process the change log records (at circle (5B)) and/or after the index writers 308 have indexed this data (at circle (8B)). Thereafter, when the change log records and the redo logs have been updated, the modification can be reported back to the database client 116 as shown via circle (9).

For further detail, FIG. 4 illustrates exemplary change log records in a change log table 312 and exemplary transaction records in a transaction table 314 in a distributed relational database service utilizing split volume types for redo log records and change log records according to some embodiments. As indicated above, the tuple storage nodes 202 may store data pertaining to change log records in one or more data structures, such as change log tables 312, transaction tables 314, etc.

For example, each stored change log record 402A-402M in the change log table 312 may include one or more of the following fields, some or all having come from the change log record and/or its header (populated by the head node): a LSN value, the database name the record pertains to, a transaction ID, a shard sequence number, a timestamp (e.g., of when the statement began executing), an event type (e.g., a type code from the database), an event length indicating a length of the event, any event flags, an offset in the transaction, the actual change log change data itself, etc. In some embodiments, other fields could be extracted from change log events, such as a table name (of the table associated with the event), a column name, etc. In some embodiments, this table may be indexed over one or more columns—e.g., over transaction ID and/or shard sequence number.

As another example, transaction data pertaining to the change log events may be stored in a transaction table 314 as records 404A-404N. In some embodiments, each record includes one or more of the following fields: a transaction ID, a shard sequence number, a commit sequence number (the global sequence number of committed transactions), a commit status (e.g., committed or rolled back or started), a begin transaction timestamp, an end transaction timestamp, a server ID of the server that committed the transaction, a begin LSN, an ending LSN, a file name, a file offset, a list of associated shards, a total change data length, etc. In some embodiments, this table may be indexed over one or more columns—e.g., over the commit sequence number.

With these indexes, a streaming storage server 208 can provide a variety of types of access to the change log data without needing to involve the database nodes 118 or page storage nodes 116. However, in some embodiments, the operations of the streaming storage server 208 could be implemented in one or more of the database nodes 118, which would beneficially eliminate the need for the storage servers (and thus, easier configuration for the clients) though it may, in comparison to the use of storage servers, increase processing load on the database nodes.

Figure 5:
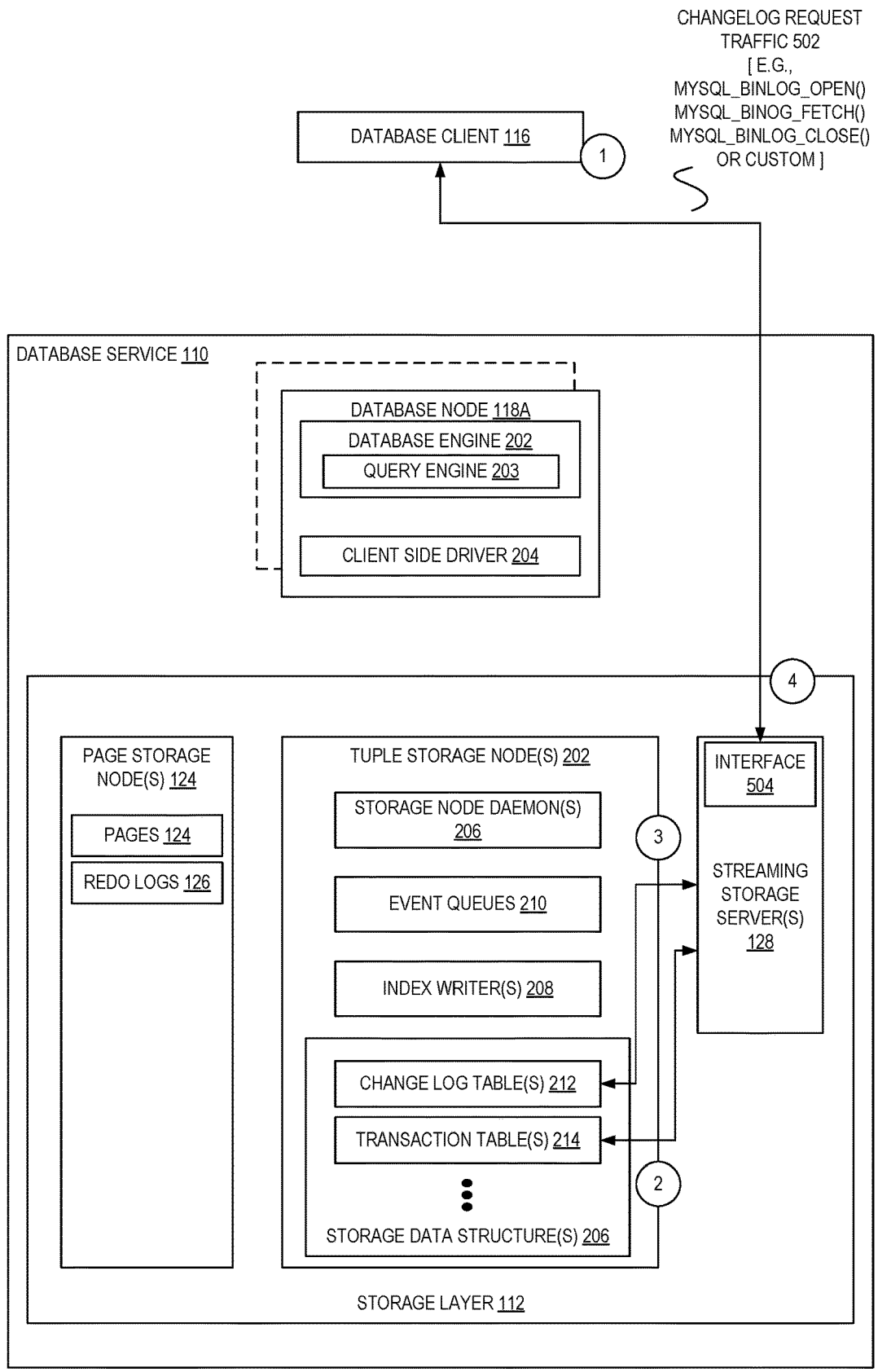
FIG. 5 illustrates exemplary change log read operations via a streaming storage server in a distributed relational database service utilizing split volume types for redo log records and change log records according to some embodiments.

FIG. 5 illustrates exemplary change log read operations via a streaming storage server in a distributed relational database service utilizing split volume types for redo log records and change log records according to some embodiments. As shown in FIG. 5, in some embodiments, a "read" against the change log will bypass the head node(s) 118 completely, and instead will come from a streaming storage server 208, which transfers the load away from the performance-critical database nodes 118 onto a separate system.

For example, the streaming storage server(s) 208 expose a change log interface 504 to clients 116, which could support existing change log-associated requests 502 (e.g., mysql_binlog_open( ), mysql_binlog_fetch( ), mysql_binlog_close( ), etc.) or even custom change-log associated requests. Thus, the database client 116 at circle (1) may issue one or more change log requests to an address (e.g., a network address) associated with the streaming storage server(s) 208—instead of issuing it to the database node(s) 118. For example, the database client 116, may issue a request to fetch a set of change logs from a particular offset at circle (1).

The streaming storage server(s) 208 may then identify what data is being requested and may query the storage data structures 206 to perform the proper operations. For example, the streaming storage server(s) 208 may query the one or more transaction tables 314 to get a list of shards that would satisfy the request (or identify change logs from transactions that have committed), and may then query the one or more change log tables 312 from those shards at circle (3) to obtain the necessary data, collate these entries, and return them at circle (4) back to the client 116. Notably, this process pushes the computation closer to the storage layer and can avoid the need to perform database page filtering of records, as instead the change log data can be accessed directly via database type retrieval commands. For example, a client may now seek a range of records—from a whole transaction, all records pertaining to a particular table, all records pertaining to a particular user, all records from a particular window of time, etc.—without needing to pull back a complete set of records and filter them down. Thus, instead of accessing change log records according to files or offsets, the access can be logical and provide various ways of obtaining useful data.

As indicated above, the streaming storage server(s) 208 may additionally or alternatively provide an interface with "custom" (e.g., not part of a database engine protocol or SQL protocol) requests to beneficially now allow multiple new use cases, such as requests for one or more of: returning the records at a given offset, returning all change logs between times t1 and t2 (e.g., all logs for transactions that started between t1 and t2, transactions that committed between t1 and t2, and/or transactions that started and committed between t1 and t2), returning change records for a particular table or group of tables, returning all updates made by a user over a period of time, returning all the data definition statement (DDL) statements that have occurred within a time period, returning all transactions that were rolled back within a certain duration, returning the average, minimum, maximum, and/or range of transaction times for transactions occurring within a window of time, returning the distribution of inserts/updates/deletes on tables, optionally scaled by row count, etc. Beneficially, using indexed data structures, these types of information (and others) can be easily obtained with minimal overhead compared to the overhead required to generate this data in previous systems needing to load and step through potentially huge amounts of redo logs over a period of time, filtering out data that is not relevant.

Figure 6:
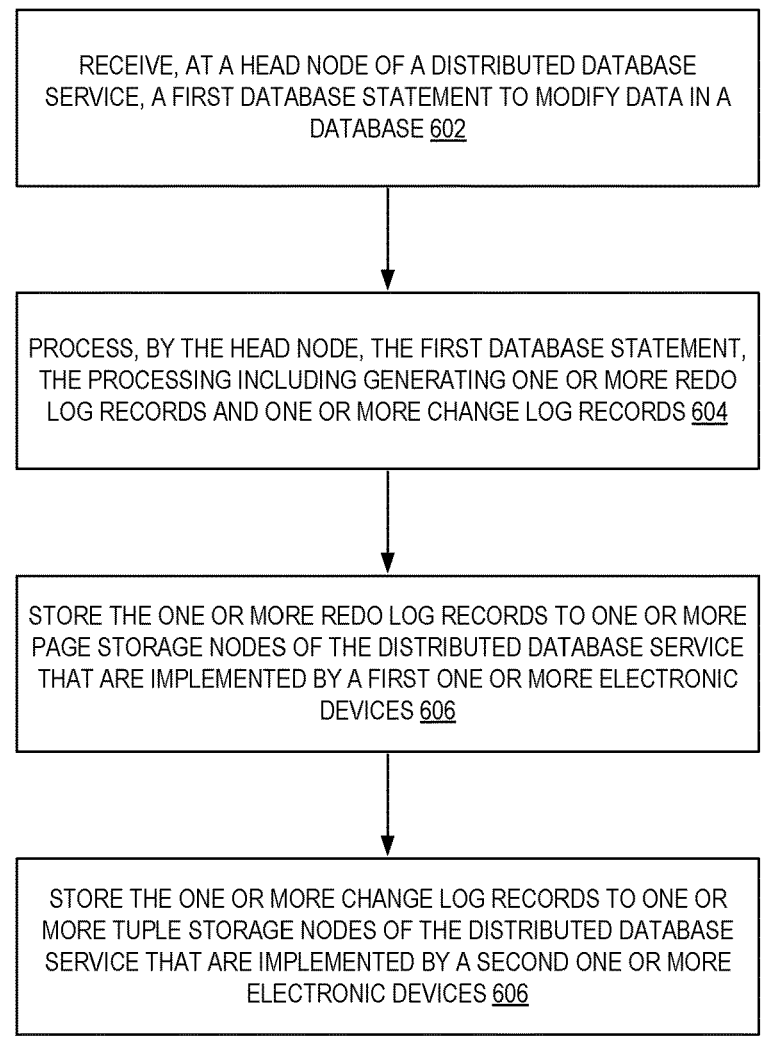
FIG. 6 is a flow diagram illustrating operations of a method for split log record and change log storage in a distributed database according to some embodiments.

FIG. 6 is a flow diagram illustrating operations of a method for split log record and change log storage in a distributed database according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by database node(s) 114 (or, "head nodes") of the other figures.

The operations 600 include, at block 602, receiving, at a head node of a distributed database service, a first database statement to modify data in a database.

The operations 600 further include, at block 604, processing, by the head node, the first database statement, the processing including generating one or more redo log records and one or more change log records.

The operations 600 further include, at block 606, storing the one or more redo log records to one or more page storage nodes of the distributed database service that are implemented by a first one or more electronic devices; and, at block 608, storing the one or more change log records to one or more tuple storage nodes of the distributed database service that are implemented by a second one or more electronic devices.

In some embodiments, the operations 600 further include receiving, at the head node from the one or more page storage nodes, one or more data pages generated based at least in part on the one or more redo log records; receiving, at the head node, a second database statement to read data from the database; and processing, at the head node, the second database statement using the one or more data pages. In some embodiments, the operations 600 further include receiving, at a streaming storage server of the distributed database that is implemented by a third one or more electronic devices, a request involving a change log associated with the first database; obtaining, by the streaming storage server, data from one or more data structures of the one or more tuple storage nodes; and transmitting response data that is based at least in part on the obtained data. In some embodiments, the one or more data structures include one or more change log indexing data structures storing change log data and further include one or more transaction indexing data structures storing transactional metadata associated with the change log data.

In some embodiments, obtaining the data from the one or more data structures of the one or more tuple storage nodes includes: identifying, via use of the one or more transaction indexing data structures and data from the request, one or more transaction identifiers; and obtaining data from the one or more change log indexing data structures based at least in part on use of the one or more transaction identifiers.

In some embodiments, the request seeks information including a set of change log records beginning at an offset, and wherein the request specifies the offset.

In some embodiments, the request seeks information including: change log records associated with transactions that started within a time range specified by the request, committed within the time range, or started and committed within the time range; change log records for a table specified by the request; change log records associated with a particular user specified by the request; or change log records associated with data definition statement (DDL) operations.

In some embodiments, the request seeks information describing at least one of: transactions that were rolled back within a period of time; a statistical function of transaction times within a period of time; or a distribution of types of database statements issued to one or more tables, the types including two or more of inserts, updates, or deletes.

In some embodiments, the operations 600 further include determining, at the head node, that the one or more change log records have been successfully persisted by the one or more tuple storage nodes; and transmitting a message to the streaming storage server indicating that the one or more change log records have been successfully persisted.

In some embodiments, the distributed database service is implemented within a multi-tenant provider network, and wherein the first database statement is a Standard Query Language (SQL) statement.

Figure 7:
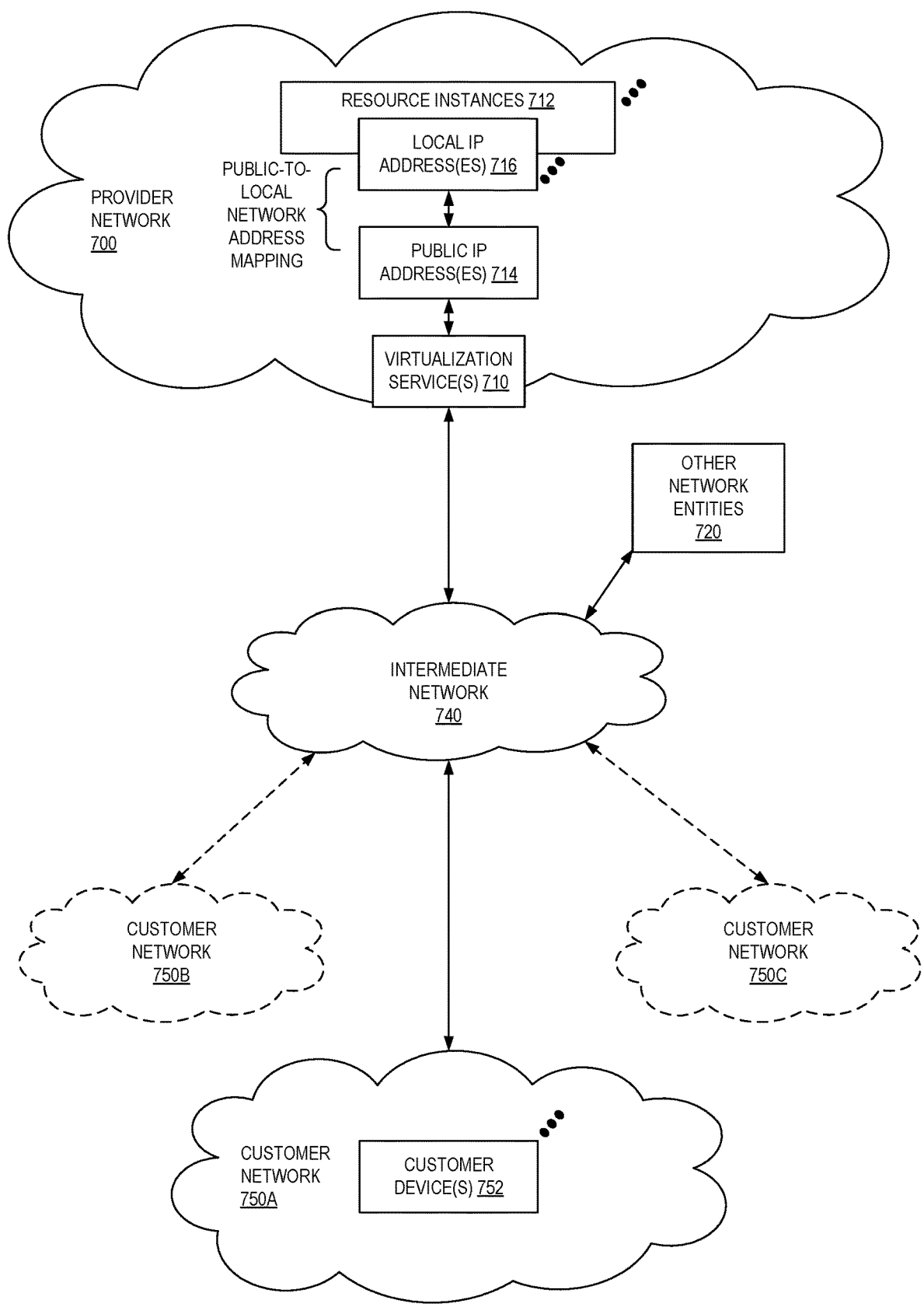
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
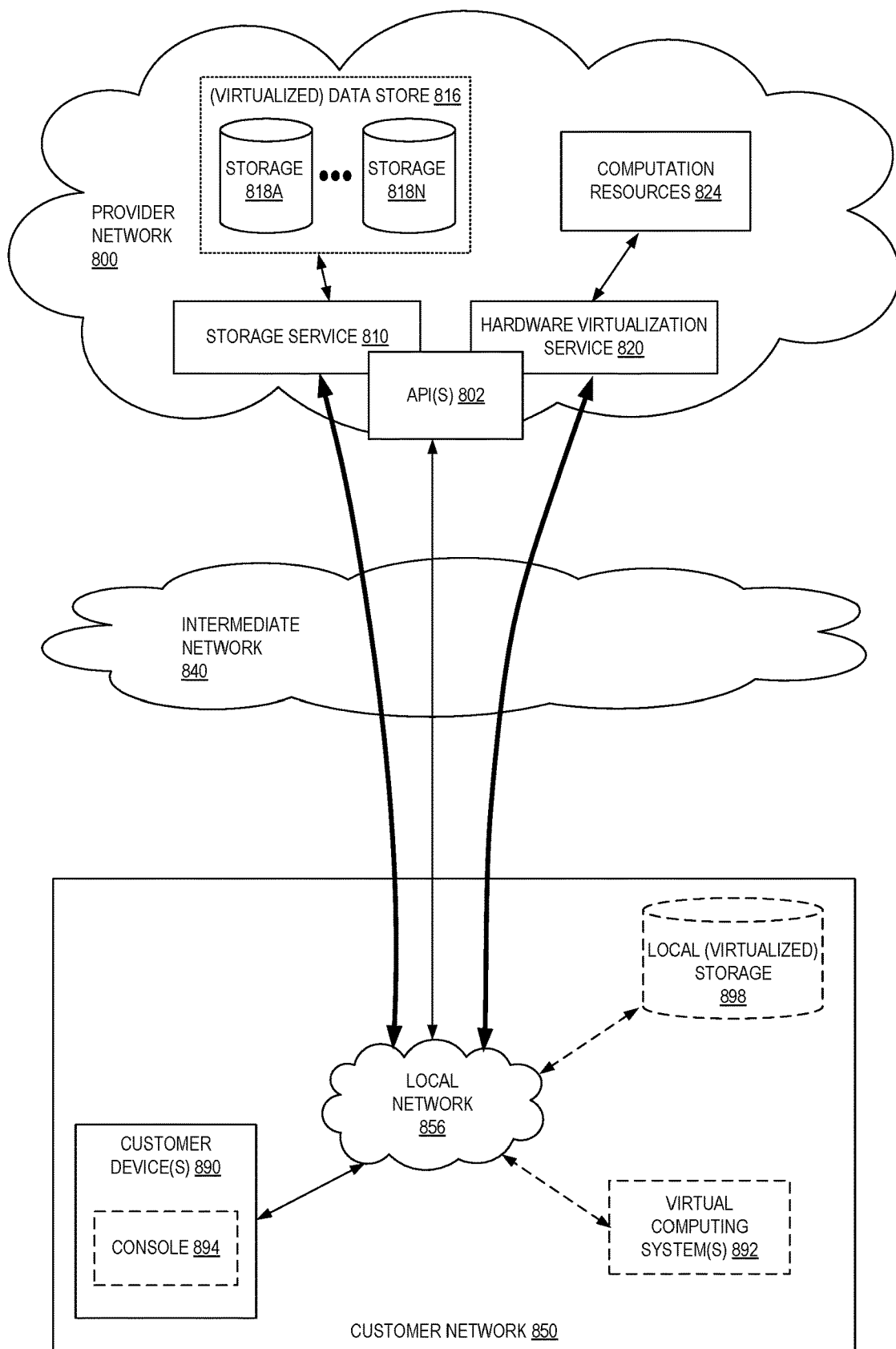
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
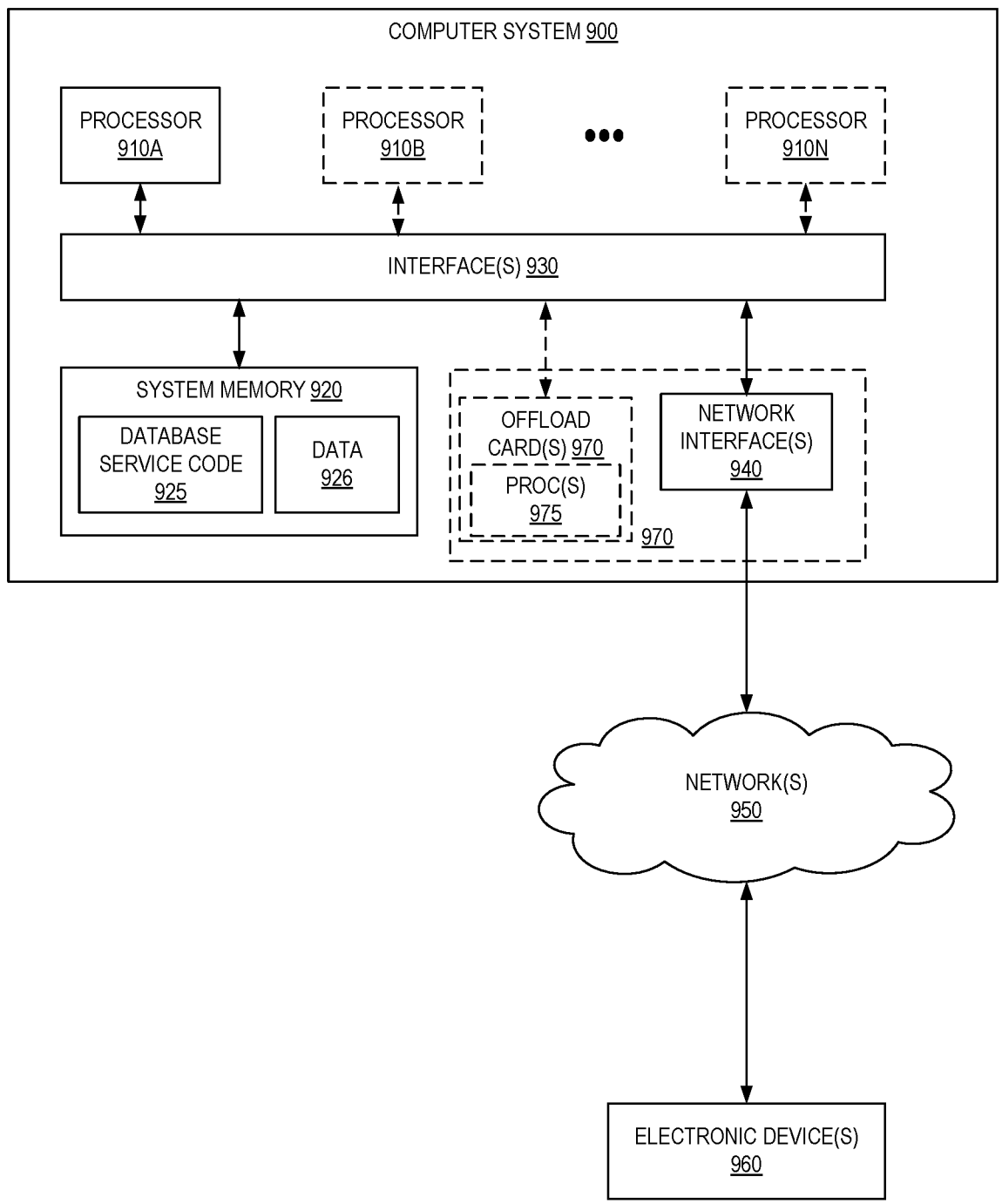
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as database service code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, at a head node of a distributed database service, a first database statement originated by a client to be executed using a first database hosted by the distributed database service, wherein the first database statement is an INSERT, UPDATE, or DELETE Structured Query Language (SQL) statement;
    processing, by the head node, the first database statement, the processing including generating one or more redo log records specifying a change made to the first database in response to receiving the first database statement, and one or more change log records specifying a change made to table data of the first database in response to receiving the first database statement;
    storing the one or more redo log records to one or more page storage nodes of the distributed database service that are implemented by a first one or more electronic devices;

storing the one or more change log records to one or more tuple storage nodes of the distributed database service that are implemented by a second one or more electronic devices;
receiving, at the head node, a second database statement, wherein the second database statement is a SELECT SQL statement;
processing the second database statement based at least in part on use of one or more data pages generated by the one or more page storage nodes based on the one or more redo log records;
receiving, at a streaming storage server of the distributed database service implemented by a third one or more electronic devices, a request involving a change log associated with the first database;
obtaining, by the streaming storage server, obtained data from one or more data structures of the one or more tuple storage nodes based at least in part on the request; and
transmitting response data that is based at least in part on the obtained data.

2. The computer-implemented method of claim 1, wherein the one or more data structures include one or more change log indexing data structures storing change log data and further include one or more transaction indexing data structures storing transactional metadata associated with the change log data.

3. The computer-implemented method of claim 2, wherein obtaining the data from the one or more data structures of the one or more tuple storage nodes comprises:
identifying, via use of the one or more transaction indexing data structures and data from the request, one or more transaction identifiers; and
obtaining data from the one or more change log indexing data structures based at least in part on use of the one or more transaction identifiers.

4. A computer-implemented method comprising:
receiving, at a head node of a distributed database service, a first database statement to modify data in a database;
processing, by the head node, the first database statement, the processing including generating one or more redo log records specifying a change made to the database in response to receiving the first database statement, and one or more change log records specifying a change made to table data of the database in response to receiving the first database statement;
storing the one or more redo log records to one or more page storage nodes of the distributed database service that are implemented by a first one or more electronic devices;
storing the one or more change log records to one or more tuple storage nodes of the distributed database service that are implemented by a second one or more electronic devices;
receiving a request related to a change log associated with the first database statement;
obtaining data from one or more data structures of the one or more tuple storage nodes based at least in part on the request; and
transmitting response data that is based at least in part on the data obtained from the one or more data structures.

5. The computer-implemented method of claim 4, further comprising:
receiving, at the head node from the one or more page storage nodes, one or more data pages generated based at least in part on the one or more redo log records;
receiving, at the head node, a second database statement to read data from the database; and
processing, at the head node, the second database statement using the one or more data pages.

6. The computer-implemented method of claim 4, further comprising:
receiving, at the head node, a second database statement, wherein the second database statement is a SELECT SQL statement; and
processing the second database statement based at least in part on use of one or more data pages generated by the one or more page storage nodes based on the one or more redo log records.

7. The computer-implemented method of claim 4, wherein the one or more data structures include one or more change log indexing data structures storing change log data and further include one or more transaction indexing data structures storing transactional metadata associated with the change log data.

8. The computer-implemented method of claim 7, wherein obtaining the data from the one or more data structures of the one or more tuple storage nodes comprises:
identifying, via use of the one or more transaction indexing data structures and data from the request, one or more transaction identifiers; and
obtaining data from the one or more change log indexing data structures based at least in part on use of the one or more transaction identifiers.

9. The computer-implemented method of claim 4, wherein the request seeks information comprising a set of the change log records beginning at an offset, and wherein the request specifies the offset.

10. The computer-implemented method of claim 4, wherein the request seeks information comprising:
change log records associated with transactions that started within a time range specified by the request, committed within the time range, or started and committed within the time range;
change log records for a table specified by the request;
change log records associated with a particular user specified by the request; or
change log records associated with data definition statement (DDL) operations.

11. The computer-implemented method of claim 4, wherein the request seeks information describing at least one of:
transactions that were rolled back within a period of time;
a statistical function of transaction times within a period of time; or
a distribution of types of database statements issued to one or more tables, the types including two or more of inserts, updates, or deletes.

12. The computer-implemented method of claim 4, further comprising:
determining, at the head node, that the one or more change log records have been successfully persisted by the one or more tuple storage nodes; and
transmitting a message to the streaming storage server indicating that the one or more change log records have been successfully persisted.

13. The computer-implemented method of claim 4, wherein the distributed database service is implemented within a multi-tenant provider network, and wherein the first database statement is a Standard Query Language (SQL) statement.

14. A system comprising:
one or more page storage nodes of a storage layer of a distributed database service in a multi-tenant provider network, the one or more page storage nodes being implemented by a first one or more electronic devices, including one or more first processors, to store redo log data and to provide data pages to one or more head nodes of the distributed database service;
one or more tuple storage nodes of the storage layer for the distributed database service, the one or more tuple storage nodes being implemented by a second one or more electronic devices, including one or more second processors, to maintain one or more data structures for change log data; and
the one or more head nodes of the distributed database service, the one or more head nodes being implemented by a third one or more electronic devices and comprising instructions that when executed by one or more third processors cause the one or more head nodes to:
receive a first database statement, from a client, to modify data in a database;
process the first database statement, comprising generating one or more redo log records specifying a change made to the database in response to receiving the first database statement, and one or more change log records specifying a change made to table data of the database in response to receiving the first database statement;
store the one or more redo log records to the one or more page storage nodes;
store the one or more change log records to the one or more tuple storage nodes; and
send a response to the client indicating that the first database statement has been executed; and
one or more streaming storage servers implemented by a fourth one or more electronic devices, the one or more streaming storage servers comprising streaming storage instructions that when executed by one or more fourth processors cause the one or more streaming storage servers to:
receive a request related to a change log associated with the first database statement;
obtain data from one or more data structures of the one or more tuple storage nodes based at least in part on the request; and
transmit response data that is based at least in part on the data obtained from the one or more data structures.

15. The system of claim 14, wherein the instructions comprise further instructions that when executed by the one or more third processors further cause the one or more head nodes to:
receive, from the one or more page storage nodes, one or more data pages generated based at least in part on the one or more redo log records;
receive a second database statement to ready data from the database; and
process the second database statement using the one or more data pages.

16. The system of claim 15, wherein the request seeks information describing at least one of:
transactions that were rolled back within a period of time;
a statistical function of transaction times within a period of time; or
a distribution of types of database statements issued to one or more tables, the types including two or more of inserts, updates, or deletes.

17. The system of claim 14, wherein the one or more data structures include one or more change log indexing data structures storing the change log data and further include one or more transaction indexing data structures storing transactional metadata associated with the change log data.

18. The system of claim 17, wherein to obtain the data from the one or more data structures, the streaming storage instructions comprise further instructions that when executed by the one or more fourth processors further cause the one or more streaming storage servers to:
identify, via use of the one or more transaction indexing data structures, identifiers of one or more transactions; and
obtain data from the one or more change log indexing data structures based at least in part on the identifiers of the one or more transactions.

19. The system of claim 14, wherein the instructions comprise further instructions that when executed by the one or more third processors further cause the one or more head nodes to:
determine that the one or more change log records have been successfully persisted by the one or more tuple storage nodes; and
transmit a message to the one or more streaming storage servers indicating that the one or more change log records have been successfully persisted.

20. The system of claim 14, wherein the first database statement is a Standard Query Language (SQL) statement.

* * * * *